United States Patent
Viswanath et al.

(10) Patent No.: US 7,643,485 B2
(45) Date of Patent: Jan. 5, 2010

(54) METHOD AND SYSTEM FOR MANAGING COMMUNICATION OF ROUTER INFORMATION

(75) Inventors: Kappagal Joish Viswanath, Vijayanagar (IN); Mrityunjay Sharanappa Hubli, Kanakpura Road (IN); Mahesh Kumar, Mahadevapura Extension (IN)

(73) Assignee: Cisco Technology, Inc., San Jose, CA (US)

( * ) Notice: Subject to any disclaimer, the term of this patent is extended or adjusted under 35 U.S.C. 154(b) by 615 days.

(21) Appl. No.: 11/227,522

(22) Filed: Sep. 15, 2005

(65) Prior Publication Data

US 2007/0076718 A1    Apr. 5, 2007

(51) Int. Cl.
*H04L 12/56* (2006.01)
(52) U.S. Cl. ........................... 370/392; 370/254

(58) Field of Classification Search ............... 370/392, 370/254, 463; 709/228
See application file for complete search history.

(56) References Cited

U.S. PATENT DOCUMENTS

| 5,351,237 | A | | 9/1994 | Shinohara | |
|---|---|---|---|---|---|
| 5,546,379 | A | * | 8/1996 | Thaweethai et al. | ......... 370/254 |
| 7,143,173 | B2 | * | 11/2006 | Wojtkiewicz | ............... 709/228 |
| 2003/0086425 | A1 | * | 5/2003 | Bearden et al. | ............. 370/392 |

* cited by examiner

*Primary Examiner*—Albert T Chou
(74) *Attorney, Agent, or Firm*—Trellis IP Law Group, PC (57) ABSTRACT

A method and apparatus for managing communication of router information in a network is disclosed. Consumers of the router information are determined on an interface in the network. The interface is set as a passive interface if no consumers are present on the interface. A passive interface is an interface on which the communication of router information is disallowed.

20 Claims, 6 Drawing Sheets

METHOD AND SYSTEM FOR MANAGING COMMUNICATION OF ROUTER INFORMATION

BACKGROUND OF THE INVENTION

1. Field of Invention

Embodiments of the invention relate to network management. More specifically, the embodiments of the invention relate to methods and systems for managing router information in a network.

2. Description of the Background Art

In a network of data-processing machines, routing protocols are used to exchange router information. Examples of network include a Local Area Network (LAN), a Wide Area Network (WAN), a Metropolitan Area Network (MAN), an enterprise network, and the like. Examples of routing protocols include the Interior Gateway Routing Protocol (IGRP), the Open Shortest Path First (OSPF), the Exterior Gateway Protocol (EGP), the Routing Information Protocol (RIP), and the Routing Information Protocol version 2 (RIPv2). The router information is used by network protocols to specify how data transmissions are routed. Examples of network protocols include Internet Protocol (IP), DECnet, OSI, Banyan VINES, and the Xerox Network System (XNS).

In an enterprise network, RIPv2 may be used as a routing protocol. Examples of enterprise networks include a corporate LAN, an interconnected group of corporate LANs, intranets, and extranets. According to the routing protocol, routing devices communicate router information on one or more interfaces. A routing device is a network device that can route data transmission across a network. Examples of routing devices include routers, gateway-routers, and the like. Interfaces connect each network device to other network devices in the network. These network devices can be one or more of routing devices, switches, bridges, gateways, and the like. Router information includes routing updates, which can also include information about changes in a routing table. The routing table can be a list of zero or more networks that are recognized by the routing device. The routing updates can be communicated to each of the directly connected networks every 30 seconds.

There can be a situation when there are no consumers of the router information on one or more interfaces. A consumer is a network device connected to a routing device, which can process the router information. Examples of network devices that are not consumers include layer-2 switches and bridges, which cannot process the router information. However, routing devices still communicate router information on the interfaces connecting the network devices, which are not consumers. This places an extra load on the CPU and memory resources of the routing devices. This can also increase network traffic because the router information, which is not needed by the network devices, is also communicated on the network.

An administrator disables one or more interfaces connecting the routing device to network devices that are not consumers, by making the interfaces passive. In large networks, making interfaces with no consumers passive may result in administrative overheads and increase the likelihood of faulty configuration.

DETAILED DESCRIPTION OF EMBODIMENTS OF THE INVENTION

Various embodiments of the invention provide a method, a system, and a computer program product for managing communication of router information in a network. According to the various embodiments of the invention, the presence of zero or more consumers is determined on an interface. A consumer is a network device on an interface, which can process the router information. The interface is set to be a passive interface if no consumers are present on the interface. After setting the interface as a passive interface, communication of router information is disallowed on the passive interface.

In a network of data-processing units, one or more network management systems are used to manage one or more network devices present in the network. Examples of data-processing units include personal computers, laptops, workstations, mobile communication devices, and the like. Each network management system, hereinafter referred to as an NMS, is assigned a set of network devices to manage. Examples of the NMS may include the 'CiscoWorks LAN Management Solution' and the 'CiscoWorks Small Network Management Solution'. The NMS executes applications that monitor and control managed network devices.

Figure 1:
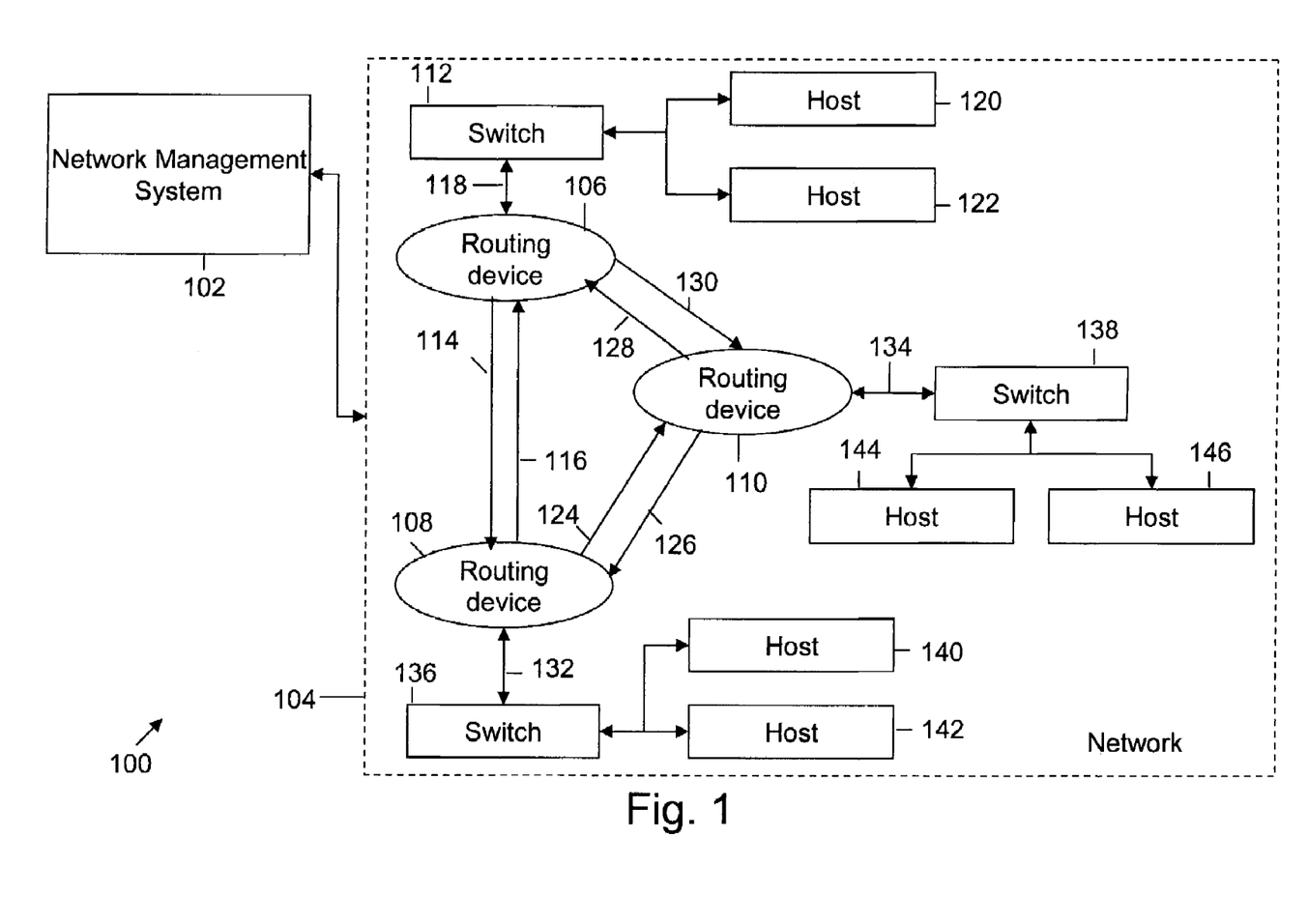
FIG. 1 illustrates a network environment including a network management system and an exemplary network, in accordance with an exemplary embodiment of the invention.

FIG. 1 illustrates a network environment 100 that includes a network management system 102 and a network 104. Network 104 is managed by NMS 102. Examples of the network include Local Area Network (LAN), Metropolitan Area Network (MAN) and Wide Area Network (WAN). In an embodiment of the invention, the network can also be an enterprise network such as a corporate LAN, intranets, and extranets. Network 104 can include network devices such as routers and switches. Each network device is connected to one or more other network devices through an interface. For example, network 104 includes a routing device 106, a routing device 108, a routing device 110, and a switch 112. Routing device 106 is connected to routing device 108 through an interface 114. Interface 114 enables communication of data from routing device 106 to 108. Moreover, routing device 108 is connected to routing device 106 through an interface 116. Interface 116 enables communication of data from routing device 108 to 106. Interface 114 and interface 116 are separately defined for a connection between routing device 106 and 108, since router information can be communicated from both the routing devices 106 and 108. Therefore, communication of routing information between two routing devices can be bidirectional. Routing device 106 is also connected to switch 112 through an interface 118. In this case, the router information can be communicated from routing device 106 only. Therefore, communication of routing information is unidirectional in this case.

Network 104 can further include host computers, hereinafter referred to as host. Each host can be connected to a routing device through a switch. For example, a host 120 and a host 122 are connected to routing device 106 through switch 112. Therefore, the data is communicated to host 120 and host 122 through routing device 106 and switch 112. Exemplary embodiments of network 104 can also include interfaces 124, 126, 128, 130, 132, 134, switches 136, 138, and hosts 140, 142, 144 and 146.

A routing device directs data from the source of the data to its destination in the network. Each routing device should know about the connectivity of directly connected routing devices, to direct the data in the network. The routing device communicates router information on all the interfaces connecting the routing device to other network devices. The router information includes information about the connectivity of the routing device. This information allows the directly connected network devices to know about the connectivity of the routing device. For example, routing device 108 and 110 are directly connected routing device of routing device 106. Routing device 106 communicates router information on interface 114, interface 118, and interface 130. Interface 114 communicates the router information to routing device 108, interface 118 communicates the router information to switch 112, and interface 130 communicates the router information to routing device 110.

Figure 2:
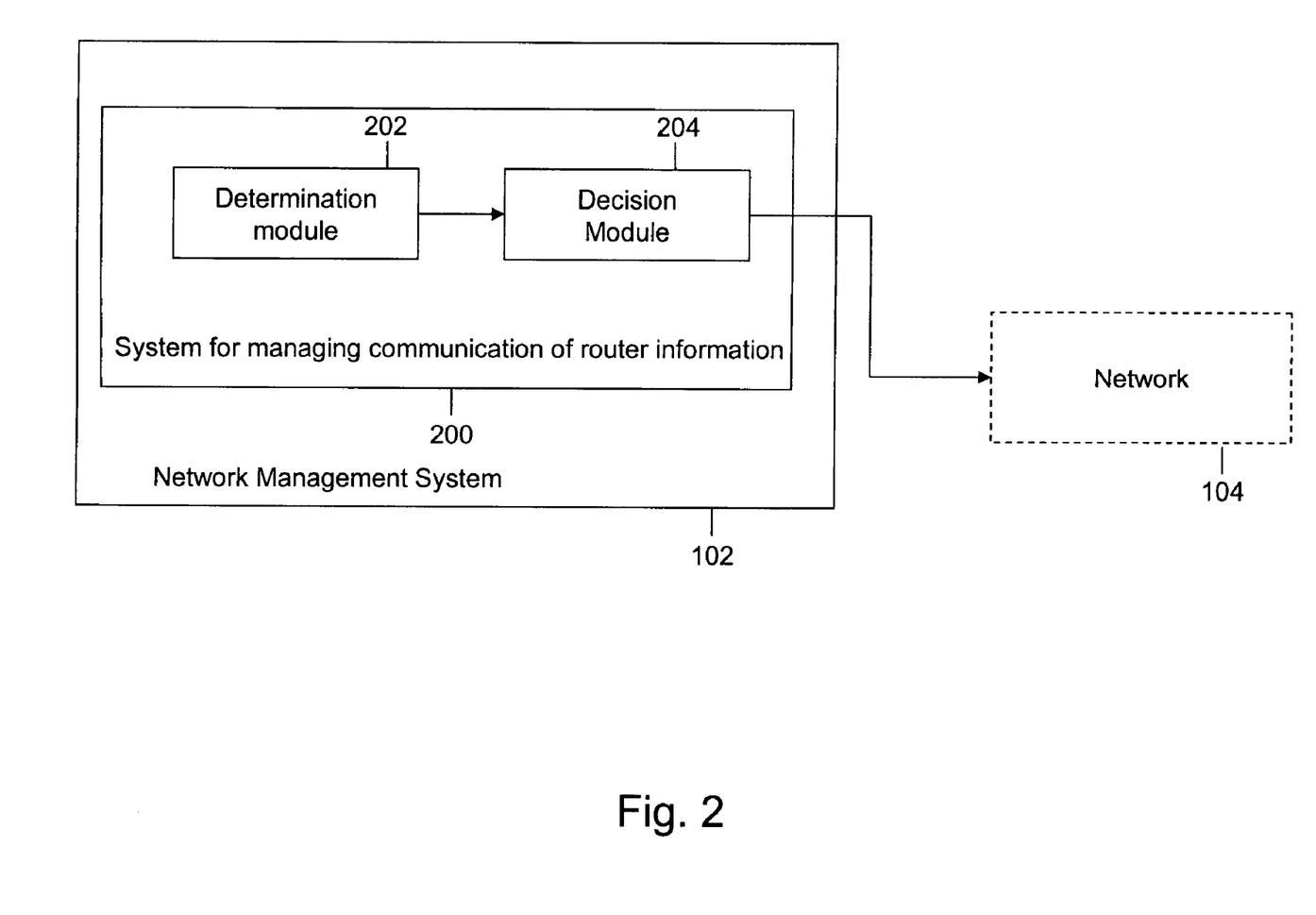
FIG. 2 illustrates a block diagram depicting a system for managing communication of router information in the network, in accordance with an exemplary embodiment of the invention.

FIG. 2 illustrates a block diagram depicting a system for managing communication of router information in network 104, hereinafter referred to as system 200. According to various embodiments, system 200 can be located at NMS 102 as an additional utility, to manage the communication of router information. System 200 can include a determination module 202, and a decision module 204. Determination module 202 can determine the presence of zero or more consumers on an interface. A consumer is a network device, which can process the router information to know about the connectivity of a routing device. For example, determination module 202 can determine the presence of one consumer on interface 114, zero consumers on interface 118, and one consumer on interface 130. After determining the presence of consumers, determination module 202 communicates information about each interface and the number of consumers on each interface to decision module 204. Decision module 204 can then set an interface as a passive interface if no consumers are present on the interface. For example, decision module 204 can set interface 118 as a passive interface. Communication of router information is disallowed on the passive interface.

In various embodiments of the invention, system 200 may be located anywhere else in network 104, other than at NMS 102.

Figure 3:
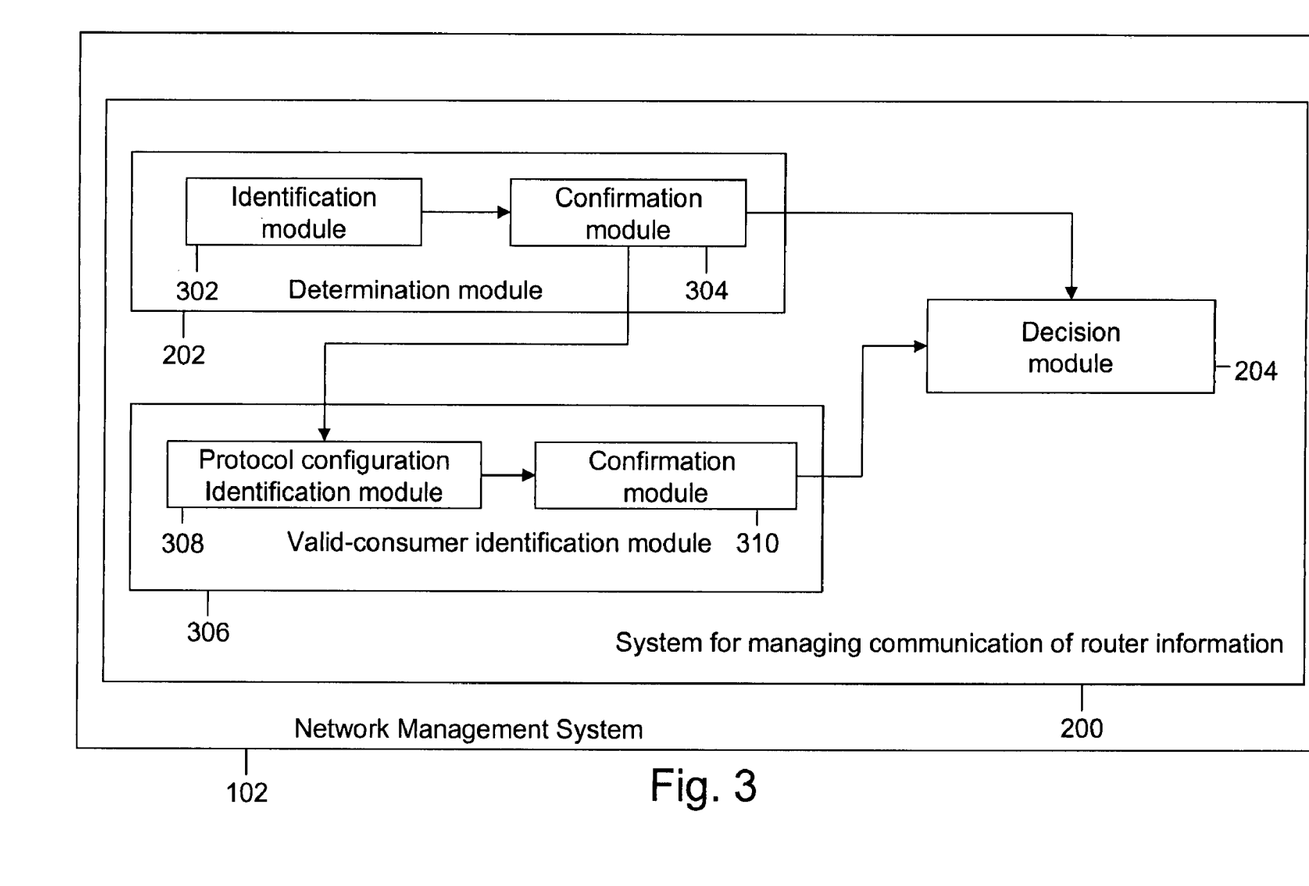
FIG. 3 illustrates a block diagram with a detailed description of different modules present in the system for managing communication of router information, in accordance with an exemplary embodiment of the invention.

FIG. 3 illustrates a block diagram with a detailed description of different modules in system 200. System 200 can include determination module 202, and a decision module 204. Determination module 202 can also include an identification module 302 and a confirmation module 304. Identification module 302 can identify one or more network devices on an interface. After the identification of one or more network devices on the interface, identification module 302 can communicate information about one or more network devices on each interface in network 104 to confirmation module 304. For example, identification module 302 identifies routing device 108 as a network device on interface 114, routing device 110 as a network device on interface 130, and switch 112 as a network device on interface 118. Identification module 302 then communicates this information to confirmation module 304.

In an embodiment of the invention, identification module 302 can execute a discovery application on NMS 102 to identify one or more network devices. The discovery application can be a software program. Execution of the software program may result in a list of one or more network devices. The list provides identification of one or more network devices.

In another embodiment of the invention, identification module 302 can query all the valid Internet Protocol (IP) addresses in a broadcast domain belonging to NMS 102.

Based on the information about one or more network devices on each interface, confirmation module 304 can determine whether a network device on an interface is a consumer. To determine that a network device is a consumer, confirmation module 304 can make a query about the parameter that determines the layer capabilities of the network device. Confirmation module 304 can then decide that the network device is a consumer, if the layer capabilities of the network device include a predefined layer capability. The predefined layer capability can be a layer-3 capability according to Open System Interconnection (OSI) standards. Confirmation module 304 can communicate information about zero or more consumers on each interface to decision module 204. For example, confirmation module 304 determines that routing device 108 has layer-3 capability, and therefore decides that routing device 108 is a consumer on interface 114. Decision module 204 can set an interface as a passive interface if no consumers are present on the interface. Communication of router information is disallowed on the passive interface.

Router information is maintained in accordance with a predefined protocol. A consumer that is not configured in the predefined protocol will not be an appropriate consumer of the router information. For example, the router information can be routing updates maintained according to RIPv2. In an embodiment of the invention, system 200 can include a valid-consumer identification module 306, to identify appropriate consumers on an interface. Confirmation module 304 can also communicate information about zero or more consumers on each interface to valid-consumer identification module 306. After obtaining this information, valid-consumer identification module 306 can identify the presence of an appropriate consumer(s) among zero or more consumers on an interface. An appropriate consumer is a consumer on an interface, which is configured in the predefined protocol. Valid-consumer identification module 306 can include a protocol configuration identification module 308 and a confirmation module 310. Protocol configuration identification module 308 can identify the protocol configuration of an identified consumer on the interface.

In another embodiment of the invention, protocol configuration identification module 308 can parse the protocol configuration of the consumer, to identify the protocol configuration of the consumer.

Protocol configuration identification module 308 can communicate information about the protocol configuration of the identified consumer to confirmation module 310. Confirmation module 310 can determine that the identified consumer is an appropriate consumer if the protocol configuration of the identified consumer is the same as the configuration of a predefined protocol. For example, if the predefined protocol is RIPv2, and the protocol configuration of routing device 106 is RIPv2, the valid-consumer identification module identifies routing device 106 as an appropriate consumer. Further, if the protocol configuration of routing device 108 is Open shortest path first (OSPF), routing device 108 is as an inappropriate consumer. Confirmation module 310 can communicate information about appropriate consumers on the interface to decision module 204. Decision module 204 can set an interface as a passive interface if no appropriate consumer is present on the interface. For example, decision module 204 can set interfaces 114 and 126 as passive interfaces, since only routing device 108 is present on both these interfaces. Communication of router information is disallowed on the interfaces 114 and 126 as they are passive interfaces.

Figure 4:
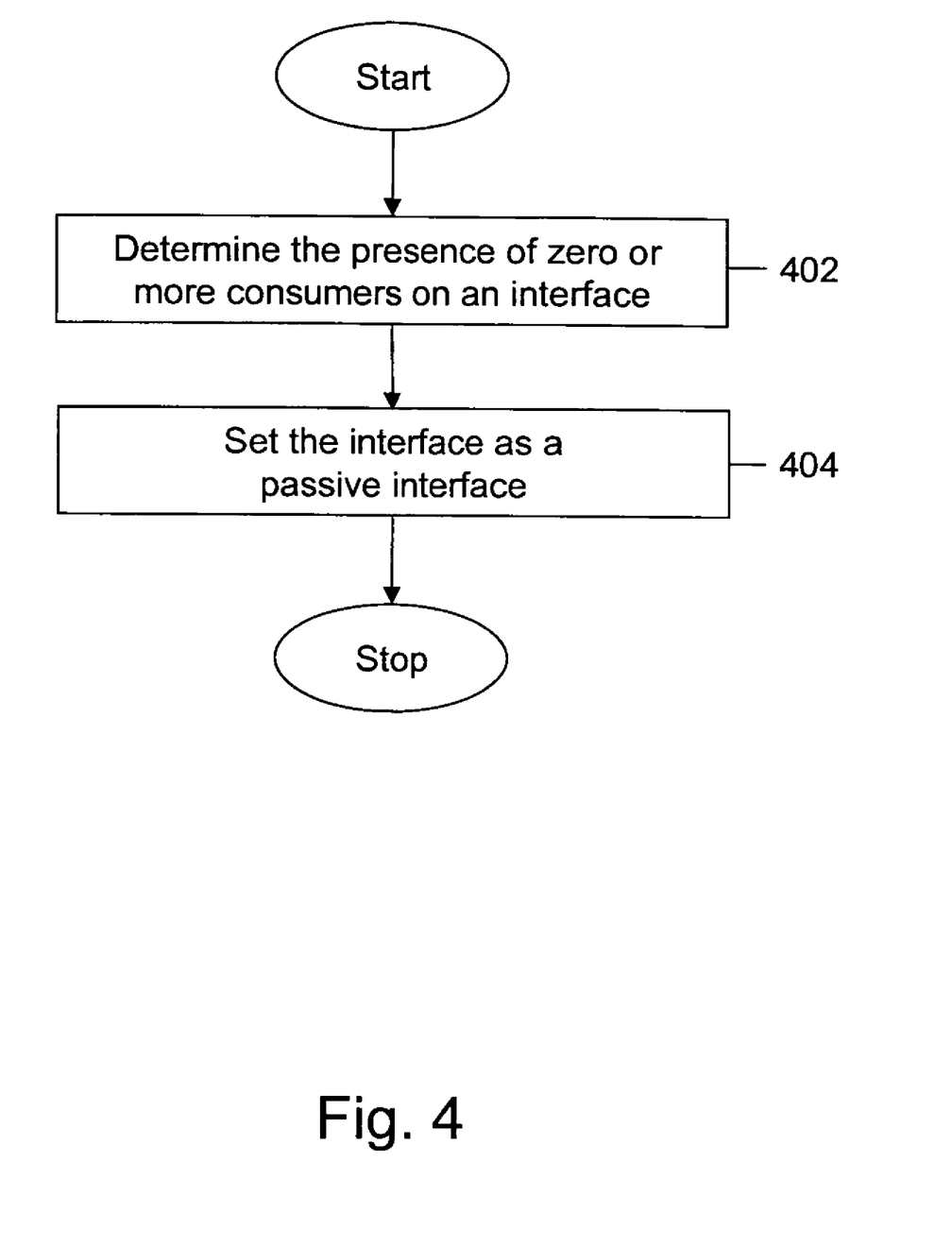
FIG. 4 illustrates a flowchart of a method for managing communication of router information in the network, in accordance with an exemplary embodiment of the invention.

FIG. 4 illustrates a flowchart of a method for managing communication of router information in network 104. A plurality of interfaces can exist in a network. For example interfaces 114, 116, and 118 exist in network 102. At step 402, the presence of zero or more consumers on an interface belonging to a plurality of interfaces is determined. According to an embodiment of the invention, this can be determined by determination module 202. At step 404, the interface is set as a passive interface if no consumers are present on the interface. In an embodiment of the invention, the interface can be set as a passive interface by decision module 204. Communication of the router information is disallowed on the passive interfaces.

In an embodiment of the invention, the steps, as illustrated in FIG. 4, can be performed in accordance with a predefined protocol. Examples of predefined protocols include RIP, RIPv2, IGRP, and the like.

In another embodiment of the invention, the steps, as illustrated in FIG. 4, can be performed whenever there is a change detected in the network configuration. Examples of a change in the network configuration include a change in network topology, a change in a network device connected on the interface, the addition of a network device on the interface, the removal of a network device from the interface, and a change in the layer capability of a network device on the interface. The NMS detects the change in network configuration and initiates the method to be performed.

In yet another embodiment of the invention, the steps, as illustrated in FIG. 4, can be performed whenever the protocol configuration of a network device on the interface modifies. Examples of a modification in the protocol configuration include a change from a first protocol configuration to a second protocol configuration, and a change in the protocol configuration itself. For example, if the protocol configuration of routing device 108 changes from an OSPF configuration to a RIPv2 configuration, the steps, as illustrated in FIG. 4, are performed again. This time, routing device 108 is identified and included as a consumer. Further, if there is a change in the existing RIPv2 configuration of routing device 106, then the steps, as illustrated in FIG. 4, are performed. NMS 102 can detect the modification by obtaining information about the running configuration of the network device. The information about the running configuration helps NMS 102 to identify the change in protocol configuration of the network device.

Figure 5:
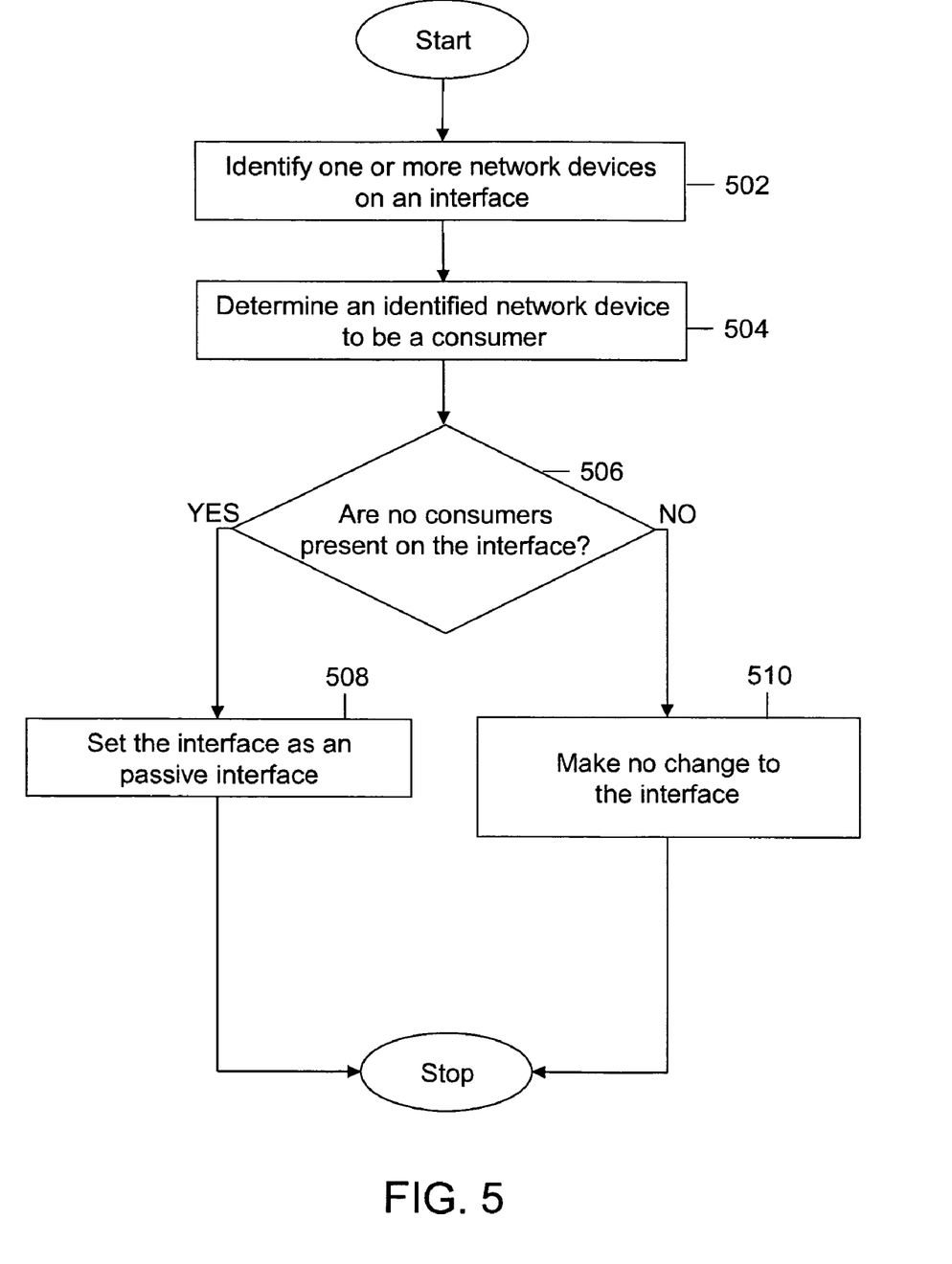
FIG. 5 illustrates a detailed flowchart of a method for managing communication of router information in the network, in accordance with an exemplary embodiment of the invention.

FIG. 5 illustrates a detailed flowchart of a method for managing communication of router information in network 100, in accordance with various embodiments of the invention. At step 502, one or more network devices can be identified on an interface belonging to a plurality of interfaces in network 104. The identification can be performed by identification module 302.

In an embodiment of the invention, one or more network devices on the interface can be identified by executing a discovery application on NMS 102.

In another embodiment of the invention, one or more network devices on the interface can be identified by querying all the valid IP addresses in a broadcast domain belonging to the interface. Queries to all the valid IP addresses can be made in accordance with Simple Network Management Protocol (SNMP).

At step 504, the system, in accordance with various embodiments, can determine whether an identified network device on the interface is a consumer. In an embodiment of the invention, confirmation module 304 can determine whether an identified network device on the interface is a consumer. The consumer is a network device, which can process the router information. A network device, which can process the router information, has a layer-3 capability according to OSI standards. The identified network device can be determined to be a consumer by querying a parameter that determines the layer capabilities of the identified network device. The parameter can be a SNMP services variable, which returns an integer value. If the integer value is equal to a predefined value, the identified network device has a layer-3 capability, for example, a query pertaining to the SNMP services variable of the identified network device, "(iso(1).org(3).dod(6) .internet(1).mgmt(2).mib-2(1).system(1).sysServices(7))", can be made to the identified network device. The SNMP services variable can be stored in an information database such as Management information base (MIB) on the identified network device. The integer value of sysServices.0 can be converted to a binary equivalent. The third least significant bit (LSB) of the binary equivalent indicates the layer capability of the device. If the third LSB is equal to 1, then the network device has a layer-3 capability. For example, if sysServices.0=6, then the identified network device has a layer-3 capability. Converting 6 into its binary equivalent provides '00000110'. The $3^{rd}$ LSB of '00000110' is 1, which indicates that the network device has a layer-3 capability. Also if sysServices.0=78, the binary equivalent is '01001110'. As the $3^{rd}$ LSB is 1, the identified network device has a layer-3 capability. The identified network device is determined to be a consumer on the interface in both the cases. If sysServices.0=2, the binary equivalent is '00000010'. As the $3^{rd}$ LSB is 0, the network device does not have a layer-3 capability. The identified network device is then not determined as a consumer on the interface. Executing step 504 for each of the identified network devices on the interface results in the identification of zero or more consumers on the interface. At step 506, a condition can be checked for the presence of zero consumers on the interface. In an embodiment of the invention, decision module 204 can check for the presence of zero consumers on the interface. At step 508, an interface can be set to be a passive interface, if no consumers are present on the interface. Communication of router information is disallowed on the passive interface. If the condition for checking the presence of zero consumers on the interface is not satisfied, then at step 510 no changes are made to the interface.

Figure 6:
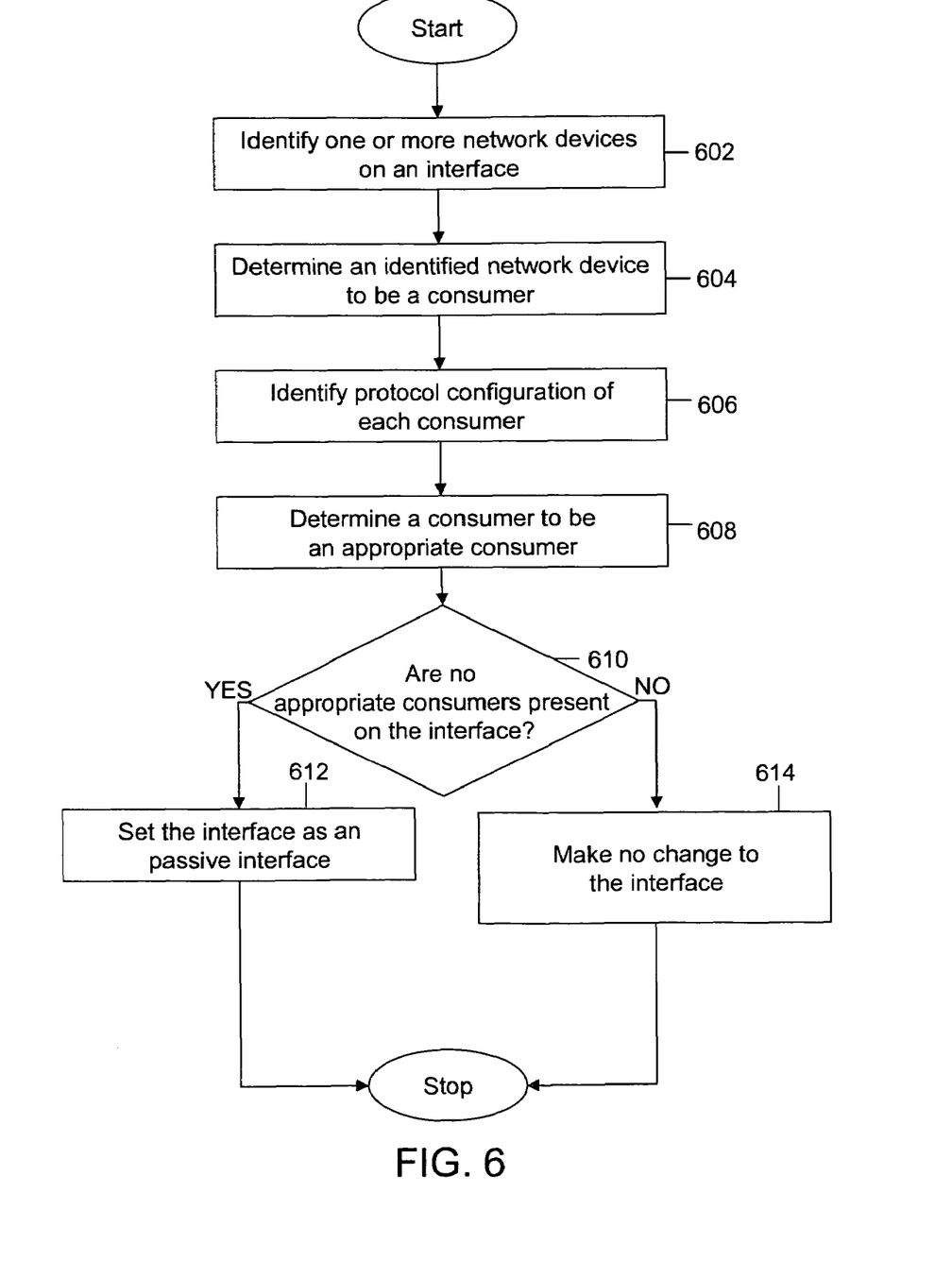
FIG. 6 illustrates a detailed flowchart for managing communication of router information in the network by identifying appropriate consumers on an interface, in accordance with an exemplary embodiment of the invention.

FIG. 6 illustrates a detailed flowchart for managing communication of router information in network 100, by identifying appropriate consumers on an interface. The identification of appropriate consumers is performed by valid-consumer identification module 306. At step 602, one or more network devices can be identified on an interface belonging to a plurality of interfaces in network 104. At step 604, an identified network device can be determined to be a consumer. In an exemplary embodiment of the invention, the determination of zero or more consumers can be performed according to the method, as described in FIG. 5. After identifying zero or more consumers on the interface, at step 606, the protocol configuration of each consumer can be identified.

In another embodiment of the invention, the identification of the protocol configuration can be performed by protocol configuration identification module 308.

In an embodiment of the invention, the identification of the protocol configuration of the consumer can be performed by parsing the protocol configuration of the consumer.

At step 608, a consumer can be determined to be an appropriate consumer if the protocol configuration of the consumer is the same as the configuration of a predefined protocol. In an embodiment of the invention, the determination of the appropriate consumer can be performed by confirmation module 308. The predefined protocol is a protocol according to which router information is maintained. For example, the predefined protocol can be RIPv2. A consumer, like routing device 106 configured in RIPv2, will be an appropriate consumer for the router information maintained according to RIPv2. However, a consumer, like routing device 108 configured in OSPF, will be an inappropriate consumer for the router information maintained according to RIPv2. At step 610, a condition can be checked to determine for the presence of zero appropriate consumers on the interface. At step 612, the interface can be set to be a passive interface if no consumers are present on the interface. Communication of router information is disallowed on the passive interface. If the condition for checking the presence of zero consumers on the interface is not satisfied at step 614, no changes are made to the interface.

Embodiments of the invention have the advantage that the extra load placed on the CPUs and memory resources of routing devices can be avoided by disallowing the communication of router information to network devices that are not consumers. Passive interfaces, on which the communication of router information is to be disallowed, are identified automatically by the method, as described by the various embodiments of the invention. Therefore, an administrator may not be needed to disable the interfaces manually. Further, administrative overhead and the likelihood of faulty configuration can be avoided. Embodiments of the invention also help in optimal deployment of a routing protocol, for example, RIPv2, by a network management system. The routing protocol can be configured automatically on the routing devices in an optimized manner. In addition, accessibility problems can be avoided, since any router information that is required for a routing device would not be blocked. Further, embodiments of the invention can block communication of any router information that is not needed by the network devices. This helps in decreasing the network traffic.

Although the invention has been discussed with respect to specific embodiments thereof, these embodiments are merely illustrative, and not restrictive, of the invention. For example, a 'method for managing communication of router information in a network' can include any type of analysis, manual or automatic, to anticipate the needs of the method.

Although specific protocols have been used to describe embodiments, other embodiments can use other transmission protocols or standards. Use of the terms 'peer', 'client', and 'server' can include any type of device, operation, or other process. The present invention can operate between any two processes or entities including users, devices, functional systems, or combinations of hardware and software. Peer-to-peer networks and any other networks or systems where the roles of client and server are switched, change dynamically, or are not even present, are within the scope of the invention.

Any suitable programming language can be used to implement the routines of the present invention including C, C++, Java, assembly language, etc. Different programming techniques such as procedural or object oriented can be employed. The routines can execute on a single processing device or multiple processors. Although the steps, operations, or computations may be presented in a specific order, this order may be changed in different embodiments. In some embodiments, multiple steps shown sequentially in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Also in the description herein for embodiments of the present invention, a portion of the disclosure recited in the specification contains material, which is subject to copyright protection. Computer program source code, object code, instructions, text or other functional information that is executable by a machine may be included in an appendix, tables, figures or in other forms. The copyright owner has no objection to the facsimile reproduction of the specification as filed in the Patent and Trademark Office. Otherwise all copyright rights are reserved.

A 'computer' for purposes of embodiments of the present invention may include any processor-containing device, such as a mainframe computer, personal computer, laptop, notebook, microcomputer, server, personal data manager or 'PIM' (also referred to as a personal information manager), smart cellular or other phone, so-called smart card, set-top box, or any of the like. A 'computer program' may include any suitable locally or remotely executable program or sequence of coded instructions, which are to be inserted into a computer, well known to those skilled in the art. Stated more specifically, a computer program includes an organized list of instructions that, when executed, causes the computer to behave in a predetermined manner. A computer program contains a list of ingredients (called variables) and a list of directions (called statements) that tell the computer what to do with the variables. The variables may represent numeric data, text, audio or graphical images. If a computer is employed for presenting media via a suitable directly or indirectly coupled input/output (I/O) device, the computer would have suitable instructions for allowing a user to input or output (e.g., present) program code and/or data information respectively in accordance with the embodiments of the present invention.

A "computer-readable medium" for purposes of embodiments of the present invention may be any medium that can contain and store the program for use by or in connection with the instruction execution system, apparatus, system or device. The computer readable medium can be, by way of example only but not by limitation, a semiconductor system, apparatus, system, device, or computer memory.

Reference throughout this specification to "one embodiment", "an embodiment" or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Further, at least some of the components of an embodiment of the invention may be implemented by using a programmed general-purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method for managing communication of router information in a network, the method comprising identifying one or more network devices connected to an interface;

querying for a parameter that defines a layer capability of the identified one or more network devices, the layer capabilities indicating whether a network device is able to process router information;

receiving the parameter defining the layer capability for the identified one or more network devices;

determining a number of consumers and non-consumers connected to the interface based on the layer capability of the identified one or more network devices determined by the querying, wherein a consumer is connected to the interface and is able to process the router information when the parameter includes a pre-defined layer capability that is determined by the querying and a non-consumer is connected to the interface and is not able to process the router information when the parameter does not includes a pre-defined layer capability that is determined by the querying, the router information being routing updates for a routing table to allow the consumer to know connectivity to the interface;

determining if the number of consumers connected to the interface is zero and the number of non-consumers is one or more; and automatically setting the interface as a passive interface if it is determined zero consumers are present on the interface, the communication of router information being disallowed on the passive interface, the interface being set to the passive interface when one or more non-consumers are connected to the interface.

2. The method of claim 1 wherein the method is performed whenever a change is detected in network configuration.

3. The method of claim 1 wherein the method is performed whenever there is a modification in the protocol configuration of a network device on the interface.

4. The method of claim 1, wherein communication of router information is managed in accordance with a pre-defined protocol.

5. The method of claim 4, wherein the predefined protocol is Router Information Protocol version 2 (RIPv2).

6. The method of claim 1, wherein identifying the one or more network devices comprises executing a discovery application on a network management system for the network.

7. The method of claim 1, wherein identifying the one or more network devices comprises querying each of the valid Internet Protocol (IP) addresses in a broadcast domain, the broadcast domain belonging to the interface.

8. The method of claim 7, wherein querying each of the valid IP addresses is performed in accordance with Simple Network Management Protocol (SNMP).

9. The method of claim 1, wherein determining the identified network device to be the consumer comprises querying an information database for a parameter that defines layer capabilities of the identified network device, the layer capabilities indicating the identified network device is a consumer able to process the router information.

10. The method of claim 1, wherein predefined layer capability includes the layer 3-capability according to Open System Interconnection (OSI) standards.

11. The method of claim 1 further comprising determining a presence of an appropriate consumer amongst the number of consumers on the interface, the appropriate consumer being configured in a predefined protocol, the pre-defined protocol being a protocol according to which the router information is maintained; and automatically setting the interface as the passive interface if no appropriate consumer is present on the interface, the communication of router information being disallowed on the passive interface, wherein a network device not configured in the pre-defined protocol and including the layer capability is considered a non-consumer.

12. The method of claim 11, wherein the determining the presence of the appropriate consumer comprises identifying the protocol configuration of each consumer; and determining a consumer to be the appropriate consumer if identified protocol configuration is same as configuration of the predefined protocol.

13. A system for managing communication of router information in a network, the system comprising means for identifying one or more network devices connected to an interface;

means for querying for a parameter that defines a layer capability of the identified one or more network devices, the layer capabilities indicating whether a network device is able to process router information;

means for receiving the parameter defining the layer capability for the identified one or more network devices;

means for determining a number of consumers and non-consumers connected to the interface based on the layer capability of the identified one or more network devices determined by the querying, wherein a consumer is connected to the interface and is able to process the router information when the parameter includes a pre-defined layer capability that is determined by the querying and a non-consumer is connected to the interface and is not able to process the router information when the parameter does not includes a pre-defined layer capability that is determined by the querying, the router information being routing updates for a routing table to allow the consumer to know connectivity to the interface;

means for determining if the number of consumers connected to the interface is zero and the number of non-consumers is one or more; and means for automatically setting the interface as a passive interface if it is determined zero consumers are present on the interface, the communication of router information being disallowed on the passive interface, the interface being set to the passive interface when one or more non-consumers are connected to the interface.

14. A system for managing communication of router information in a network, the system comprising an identification module for identifying one or more network devices connected to an interface;

a determination module for:

querying for a parameter that defines a layer capability of the identified one or more network devices, the layer capabilities indicating whether a network device is able to process router information;

receiving the parameter defining the layer capability for the identified one or more network devices; and determining a number of consumers and non-consumers connected to the interface based on the layer capability of the identified one or more network devices determined by the querying, wherein a consumer is connected to the interface and is able to process the router information when the parameter includes a pre-defined layer capability that is determined by the querying and a non-consumer is connected to the interface and is not able to process the router information when the parameter does not includes a pre-defined layer capability that is determined by the querying, the router information being routing updates for a routing table to allow the consumer to know connectivity to the interface; and a decision module for automatically setting the interface as a passive interface if it is determined zero consumers are present on the interface, the communication of router information being disallowed on the passive interface, the interface being set to the passive interface when one or more non-consumers are connected to the interface.

15. The system of claim 14 further comprises a valid-consumer identification module for identifying an appropriate consumer amongst the number of consumers on the interface, the appropriate consumer being configured in a predefined protocol, wherein a network device not configured in the pre-defined protocol and including the layer capability is considered a non-consumer.

16. The system according to claim 15, wherein the valid-consumer identification module comprises a protocol configuration identification module for identifying protocol configuration of each consumer on the interface; and a confirmation module for determining a consumer to be the appropriate consumer.

17. A computer-readable storage medium including instructions executable by a computer processor comprising one or more instructions for identifying one or more network devices connected to an interface;

one or more instructions for querying for a parameter that defines a layer capability of the identified one or more network devices, the layer capabilities indicating whether a network device is able to process router information;

one or more instructions for receiving the parameter defining the layer capability for the identified one or more network devices;

one or more instructions for determining, by the computer processor, a number of consumers and non-consumers connected to the interface based on the layer capability of the identified one or more network devices determined by the querying, wherein a consumer is connected to the interface and is able to process the router information when the parameter includes a pre-defined layer capability that is determined by the querying and a non-consumer is connected to the interface and is not able to process the router information when the parameter does not includes a pre-defined layer capability that is determined by the querying, the router information being routing updates for a routing table to allow the consumer to know connectivity to the interface;

one or more instructions for determining if the number of consumers connected to the interface is zero and the number of non-consumers is one or more; and one or more instructions for automatically setting, by the computer processor, the interface as a passive interface if it is determined zero consumers are present on the interface, the communication of router information being disallowed on the passive interface, the interface being set to the passive interface when one or more non-consumers are connected to the interface.

18. The computer readable storage medium of claim 8 further comprising one or more instructions for determining a presence of an appropriate consumer amongst the number of consumers on the interface, the appropriate consumer being configured in a predefined protocol, the pre-defined protocol being a protocol according to which the router information is maintained; and one or more instructions for automatically setting the interface as the passive interface if no appropriate consumer is present on the interface, the communication of router information being disallowed on the passive interface, wherein a network device not configured in the pre-defined protocol and including the layer capability is considered a non-consumer.

19. An apparatus for allocating a resource in a digital network, the apparatus comprising a computer processor for executing instructions; and a computer-readable storage medium including instructions executable by the computer processor comprising one or more instructions for identifying one or more network devices connected to an interface;

one or more instructions for querying for a parameter that defines a layer capability of the identified one or more network devices, the layer capabilities indicating whether a network device is able to process router information;

one or more instructions for receiving the parameter defining the layer capability for the identified one or more network devices;

one or more instructions for determining, by the computer processor, a number of consumers and non-consumers connected to the interface based on the layer capability of the identified one or more network devices determined by the querying wherein a consumer is connected to the interface and is able to process the router information when the parameter includes a pre-defined layer capability that is determined by the querying and a non-consumer is connected to the interface and is not able to process the router information when the parameter does not includes a pre-defined layer capability that is determined by the querying, the router information being routing updates for a routing table to allow the consumer to know connectivity to the interface;

one or more instructions for determining if the number of consumers connected to the interface is zero and the number of non-consumers is one or more; and one or more instructions for automatically setting, by the computer processor, the interface as a passive interface if it is determined zero consumers are present on the interface, the communication of router information being disallowed on the passive interface, the interface being set to the passive interface when one or more non-consumers are connected to the interface.

20. The apparatus of claim 19 wherein the computer-readable storage medium comprises:

one or more instructions for determining a presence of an appropriate consumer amongst the number of consumers on the interface, the appropriate consumer being configured in a predefined protocol, the pre-defined protocol being a protocol according to which the router information is maintained; and one or more instructions for automatically setting the interface as the passive interface if no appropriate consumer is present on the interface, the communication of router information being disallowed on the passive interface, wherein a network device not configured in the pre-defined protocol and including the layer capability is considered a non-consumer.

* * * * *

UNITED STATES PATENT AND TRADEMARK OFFICE
CERTIFICATE OF CORRECTION

PATENT NO. : 7,643,485 B2
APPLICATION NO. : 11/227522
DATED : January 5, 2010
INVENTOR(S) : Viswanath et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 776 days.

Signed and Sealed this

Twenty-first Day of December, 2010

David J. Kappos
*Director of the United States Patent and Trademark Office*